(12) United States Patent
Cordonier et al.

(10) Patent No.: US 9,126,193 B2
(45) Date of Patent: Sep. 8, 2015

(54) PHOTOCATALYTIC FILM, METHOD FOR FORMING PHOTOCATALYTIC FILM AND PHOTOCATALYTIC FILM COATED PRODUCT

(75) Inventors: Christopher Cordonier, Aichi (JP); Tetsuya Shichi, Aichi (JP); Kenichi Katsumata, Aichi (JP); Yasuhiro Katsumata, Aichi (JP); Akira Fujishima, Aichi (JP)

(73) Assignee: Central Japan Railway Company, Aichi (JP)

( * ) Notice: Subject to any disclaimer, the term of this patent is extended or adjusted under 35 U.S.C. 154(b) by 506 days.

(21) Appl. No.: 12/526,180

(22) PCT Filed: Feb. 8, 2008

(86) PCT No.: PCT/JP2008/052190
§ 371 (c)(1),
(2), (4) Date: Aug. 6, 2009

(87) PCT Pub. No.: WO2008/096871
PCT Pub. Date: Aug. 14, 2008

(65) Prior Publication Data
US 2010/0279149 A1    Nov. 4, 2010

(30) Foreign Application Priority Data
Feb. 8, 2007    (JP) .................. 2007-029318

(51) Int. Cl.
| B32B 17/06 | (2006.01) |
| B05D 3/02 | (2006.01) |
| B01J 35/00 | (2006.01) |
| B01J 23/20 | (2006.01) |
| B01J 37/02 | (2006.01) |
| C03C 17/25 | (2006.01) |
| C03C 21/00 | (2006.01) |

(52) U.S. Cl.
CPC ............... *B01J 35/004* (2013.01); *B01J 23/20* (2013.01); *B01J 37/0215* (2013.01); *C03C 17/25* (2013.01); *C03C 21/001* (2013.01); *C03C 2217/218* (2013.01); *C03C 2217/228* (2013.01); *C03C 2217/23* (2013.01); *C03C 2217/71* (2013.01); *C03C 2218/111* (2013.01)

(58) Field of Classification Search
None
See application file for complete search history.

(56) References Cited

U.S. PATENT DOCUMENTS 5,476,727 A * 12/1995 Maruta .................. 428/690
6,103,363 A     8/2000 Boire et al.
(Continued)

FOREIGN PATENT DOCUMENTS

| EP | 1074525 A1 | 7/2001 |
| JP | 07-168001 | 7/1995 |

(Continued)

OTHER PUBLICATIONS

International Search Report from priority Japan application No. PCT/JP2008/052190 (2 pages), dated May 20, 2008.
(Continued)

*Primary Examiner* — Melvin C Mayes
*Assistant Examiner* — Stefanie Cohen
(74) *Attorney, Agent, or Firm* — James L. Young; Westman Champlin & Koehler P.A.

(57) ABSTRACT

Disclosed is a method for forming a photocatalyst thin film, which is characterized in that a photocatalyst thin film containing a niobium-alkali metal complex oxide is formed by forming and then firing a layer containing niobium on the surface of a base containing an alkali metal.

15 Claims, 2 Drawing Sheets

(56) References Cited

U.S. PATENT DOCUMENTS

| | | | |
|---|---|---|---|
| 6,811,901 B1 * | 11/2004 | Arfsten et al. | 428/701 |
| 6,833,089 B1 * | 12/2004 | Kawahara et al. | 252/520.2 |
| 7,096,692 B2 * | 8/2006 | Greenberg et al. | 65/60.2 |
| 2002/0001724 A1 | 1/2002 | Anderson | |

FOREIGN PATENT DOCUMENTS

| | | |
|---|---|---|
| JP | 10-53439 | 2/1998 |
| JP | 10-273319 | 10/1998 |
| JP | 2001-150586 | 6/2001 |
| JP | 2001-303276 | 10/2001 |
| JP | 2003-003113 | 1/2003 |
| JP | 2003260369 A | 9/2003 |
| JP | 2005-290369 | 10/2005 |
| JP | 2006-247652 | 9/2006 |

OTHER PUBLICATIONS

Form PCT/IB/338 (Transmittal) and Form PCT/IPEA/409 (International Preliminary Report on Patentability) from corresponding application PCT/JP2008/052190 filed Feb. 8, 2008, mailed Oct. 15, 2009, 5 pages.

Office Action dated Apr. 22, 2011 issued for Korean application No. 10-2009-7017794 with partial English translation attached, 6 pages.

Office Action dated Jul. 13, 2011 issued for Chinese Application No. 200880004590.8 with English translation (10 pages).

Decision of Final Rejection dated Aug. 31, 2012 from Chinese Patent Office for Chinese Patent Application No. 200880004590.8.

Extended European Search Report (including supplementary European Search Report and European Search Opinion) dated May 19, 2014 for corresponding European Application No. 08 71 1069, (6 pages).

Notification of Reexamination by the Chinese Patent Office dated Dec. 17, 2013 in the corresponding Chinese Patent Application No. 200880004590.8 (9 pages).

Decision of Reexamination dated Jun. 30, 2014 issued for Chinese Patent Application No. 2000880004590.8 with English translation, 14 pages.

Chinese Office Action dated Jun. 13, 2012 from Chinese Patent Application No. 200880004590.8.

* cited by examiner

PHOTOCATALYTIC FILM, METHOD FOR FORMING PHOTOCATALYTIC FILM AND PHOTOCATALYTIC FILM COATED PRODUCT

CROSS-REFERENCE TO RELATED APPLICATION

This Application is a Section 371 National Stage Application of International Application No. PCT/JP2008/052190, filed Feb. 8, 2008 and published as WO 2008/096871 on Aug. 14, 2008, not in English.

TECHNICAL FIELD

The present invention is related to a photocatalytic film having a self-purifying function and a product including the photocatalytic film.

BACKGROUND

Photocatalysts are materials having a photocatalytic property of decomposing a substance by irradiation of ultraviolet light, and a photo-induced super-hydrophilic property of making the photocatalyst surface easily soluble in water by exposure to light. Conventionally, photocatalytic self-cleaning products based on these two properties are widely used especially as exterior building materials such as external wall materials, glasses and others.

Specifically, the photocatalytic self-cleaning products can decompose fouling by ultraviolet light present in the spectrum of sunlight and also wash off fouling on surfaces of the products by the super-hydrophilic property when rain falls. Therefore, the products are able to constantly maintain clean appearance (self-cleaning function).

There are several problems in photocatalyst coated self-cleaning glass. Currently, titanium oxide ($TiO_2$) is exclusively used as a photocatalytic material. In order to make a coating film strongly adhesive to a base and obtain a highly durable film, it is necessary to perform firing at high temperature of several hundreds centigrade.

However, since soda-lime glass that is widely used for a window contains a considerable amount of sodium ion, the sodium ion is diffused into the coating layer at the surface of the glass during firing. As a result, a compound of titanium oxide and sodium, like sodium titanate, is formed and the photocatalytic property of the glass is lost.

To avoid such problem of photocatalytic performance loss due to alkali diffusion, two methods are taken in manufacturing of photocatalytic self-cleaning glass.

One of the methods is called a room temperature curing method. In the method, fine particles of titanium oxide photocatalysts are mixed into a coating liquid that is solidified at comparatively low temperature. The resulted mixture is applied to glass and solidified at around 150° C. (see Patent Document 1, for example).

The other of the methods is called a two-layer coating method. In this method, an undercoating film containing a component like silica ($SiO_2$) is formed to inhibit alkali diffusion from a base due to firing. Thereafter, photocatalytic coating and firing are performed (see Patent Document 2, for example).

Patent Document 1: Unexamined Japanese Patent Publication No. 2001-150586

Patent Document 2: Unexamined Japanese Patent Publication No. 10-53439

In the room temperature curing method, since adhesion between glass and a coating film is not high, abrasion resistance of the film is low. This method can only be adopted for very limited use, such as in a part where there is little physical contact with others (like a window of a tall building, for example). In the two-layer coating method, although sufficient coating durability can be achieved, coating has to be performed twice. In addition, according to circumstances, the undercoating film also requires firing. Then, firing steps have to be conducted twice. Cumbersome steps and high costs become necessary.

A similar problem exists in glazed ceramic products and enameled metal products. Glaze and enamel are liquid glasses which are melted or dissolved in a medium. By applying glaze or enamel to a surface of ceramic or metal to become solidified or fired, a glassy film consisting primarily of silicate can be formed. Generally, since it is necessary to add a massive amount of sodium components in order to lower a melting point of glaze and enamel, a massive amount of sodium ion exists in the formed glassy film as in soda-lime glass. Accordingly, in order to form a photocatalytic film on a surface of these products, the room temperature curing method or the two-layer coating method has to be used.

SUMMARY

The present invention is made in consideration of the above problems. The purpose is to provide a method for forming a photocatalytic film by which a photocatalytic film having high adhesion strength to a base, high durability and a self-cleaning function can be formed in few steps. The purpose is also to provide such photocatalytic film and a product including such photocatalytic film.

In a method for forming a photocatalytic film according to a first aspect of the present invention which was made to solve the above problems, a photocatalytic film containing niobium-alkali metal complex oxide is formed by forming and then firing at a temperature of 500° C. or higher, a layer containing niobium on a surface of a base containing alkali metal.

According to the above method for forming a photocatalytic film, a photocatalytic film having high adhesion strength to a base, high durability and a self-cleaning function can be formed in few steps. Hereinafter, description on this method will be given.

In a conventional photocatalyst like titanium oxide, in case that a photocatalyst coating is formed on a surface of a base containing alkali metal such as soda-lime glass, glazed ceramic products and enameled products, for example, which contain sodium therein, photocatalytic performance of titanium oxide is deteriorated due to sodium ion in the base. Therefore, in order to suppress diffusion of sodium ion, an undercoating film has been necessary between the base and a titanium oxide film.

According to the method for forming a photocatalytic film in the first aspect, a layer containing niobium is formed and fired at a temperature of 500° C. or higher on the surface of the base containing alkali metal. When fired, alkali metal contained in the base is then heated and separated out onto the surface of the base to be diffused into the layer containing niobium on the surface of the base. Reaction involving alkali metal and niobium occurs, and thus, a photocatalytic film containing niobium-alkali metal complex oxide is formed on the surface of the base.

For example, as shown in FIG. 1, a layer containing niobium is formed and fired at a temperature of 500° C. or higher on a surface of soda-lime glass containing sodium. Then with firing, sodium contained in the soda-lime glass is heated to be separated out onto the surface of the base and diffused into the layer containing niobium on the surface of the soda-lime glass. Reaction involving the soda-lime glass and niobium occurs, and thus, a photocatalytic film containing niobium-sodium complex oxide ($NaNbO_3$, for example) is formed on the surface of the soda-lime glass.

In other words, in the method for forming a photocatalytic film according to the first aspect, alkali metal contained in the base, which has been inhibited from reacting by providing an undercoating film or the like as a cause for deteriorating photocatalytic performance, is consciously utilized to form a photocatalytic film containing niobium-alkali metal complex oxide on the surface of the base.

The fact that niobium-alkali metal complex oxide exhibits photocatalytic activity is shown in "H. Kato et. al., J. Phys. Chem. B, 106, 12441-12447 (2002)". In other words, niobium-alkali metal complex oxide has a self-cleaning property.

Also, the photocatalytic film containing niobium-alkali metal complex oxide formed by the above-described forming method is fired. Therefore, the photocatalytic film has a high degree of hardness and is superior in durability since adhesion strength to the base is high.

For the purpose of optimizing photocatalytic activity, alkali metal components may be added to the layer containing niobium.

The layer containing niobium on the surface of the base containing alkali metal may be formed by a gas phase method such as sputtering and chemical vapor deposition (CVD), or a liquid phase method using a coating liquid such as a sol-gel solution made from niobium alkoxide, a solution of a metal-organic compound containing niobium, or a dispersion of particulate niobium oxide.

In the case of liquid phase coating, all the coating methods generally used for a liquid phase method are applicable such as spin coat method, dip coat method, spray coat method, roll coat method and so on.

In the method for forming a photocatalytic film according to the first aspect of the present invention, it is preferable that the aforementioned layer containing niobium is formed by applying a coating agent containing niobium, among the aforementioned liquid phase coating methods (the second aspect of the present invention).

In this way, the layer can be formed in a simple manner of applying a coating agent containing niobium to the surface of the base. There is no necessity of large-scale equipment required in sputtering and others. The photocatalytic film containing niobium-alkali metal complex oxide can be formed at low cost.

In the method for forming a photocatalytic film according to a third aspect of the present invention, a photocatalytic film containing tantalum-alkali metal complex oxide is formed by forming and then firing at a temperature of 500° C. or higher, a layer containing tantalum on the surface of the base containing alkali metal.

The method for forming a photocatalytic film in the third aspect, as well as the method forming a photocatalytic film in the first aspect, consciously utilizes alkali metal contained in the base to form a photocatalytic film containing tantalum-alkali metal complex oxide on the surface of the base.

The fact that the tantalum-alkali metal complex oxide exhibits photocatalytic activity is shown in "H. Kato et. Al., J. Am. Chem. Soc., 125, 3082-3089 (2003)". In other words, the tantalum-alkali metal complex oxide has a self-cleaning property.

Also, the photocatalytic film containing tantalum-alkali metal complex oxide formed by the above-described forming method is fired at a temperature of 500° or higher as in the above-described photocatalytic film containing niobium-alkali metal complex oxide. Therefore, the photocatalytic film has a high degree of hardness and is superior in durability since adhesion strength to the base is high.

For the purpose of optimizing photocatalytic activity, alkali metal components may be added to the layer containing tantalum.

The layer containing tantalum on the surface of the base containing alkali metal may be formed by a gas phase method such as sputtering and chemical vapor deposition (CVD), or a liquid phase method using a coating liquid such as a sol-gel solution made from tantalum alkoxide, a solution of a metal-organic compound containing tantalum, or a dispersion of particulate tantalum oxide. In the case of liquid phase coating, all the coating methods generally used for a liquid phase method are applicable such as spin coat method, dip coat method, spray coat method, roll coat method and so on.

In the method for forming a photocatalytic film according to the third aspect of the present invention, it is preferable that the aforementioned layer containing tantalum is formed by applying a coating agent containing tantalum, among the aforementioned liquid phase coating methods.

In this way, the layer can be formed in a simple manner of applying a coating agent containing tantalum to the surface of the base. There is no necessity of large-scale equipment required in sputtering and others. The photocatalytic film containing tantalum-alkali metal complex oxide can be formed at low cost.

There are various bases containing alkali metal. In either of the above-described inventions of the first to the fourth aspects, the base containing alkali metal may be soda-lime glass (in the case of a fifth aspect of the present invention), a glassy film formed on a surface of a ceramic ware by glazing (in the case of a sixth aspect of the present invention), or a glassy film formed on a surface of a metal product by enameling (in the case of a seventh aspect of the present invention). These bases contain sodium which is alkali metal. Thus, when layers containing niobium or tantalum are formed and fired on surfaces of the bases, sodium is separated out and diffused into the layers.

Reaction involving sodium and niobium or tantalum then occurs thereby to form a film containing niobium-sodium complex oxide ($NaNbO_3$, for example) or a film containing tantalum-sodium complex oxide ($NaTaO_3$, for example) on the surface of the bases.

As noted above, since soda-lime which is mass produced and used as ordinary glass, and generally used glaze and enamel, can be a base, the photocatalytic film can be formed at low cost.

In either of the inventions according to the first to the seventh aspects, if the firing temperature is 500-550° C. (in the case of an eighth aspect of the invention), remarkable photo-induced super-hydrophilic activity and also remarkable photocatalytic activity are exhibited. Specifically, separation of sodium ion is optimum at the temperature of 500-550° C. Thus, hydrophilic activity and photocatalytic activity are enhanced.

A photocatalytic film according to a ninth aspect of the present invention is a photocatalytic film formed by the method for forming a photocatalytic film set forth in any of the inventions according to the first to the eighth aspects of the present invention.

The photocatalytic film formed by the forming method has high degree of hardness and excellent durability since the film is fired at the temperature sufficient for the film to be adhesive to the base. Additionally, since niobium-sodium complex oxide or tantalum-sodium complex oxide is formed, the film has both the super-hydrophilic property and photocatalytic activity, and a self-cleaning function as well.

A photocatalytic film-coated product according to an eleventh aspect of the present invention is a photocatalytic film-coated product including a base containing alkali metal and the photocatalytic film set forth in the ninth aspect provided on a surface of the base.

Since the photocatalytic film has high degree of hardness and excellent adhesion to the base, the photocatalytic film-coated product is superior in durability. Especially, in case that the photocatalytic film is fired at high temperature, adhesion and durability is all the more excellent. Furthermore, since the film includes niobium-sodium complex oxide or tantalum-sodium complex oxide, the product has both the super-hydrophilic property and photocatalytic activity. The product is also superior in self-cleaning function.

Accordingly, in case that the base is glass, the glass can be stain-resistant and maintain transparency for a long term. In case that the base is a mirror, the mirror can be stain-resistant and maintain reflectivity for a long term.

Moreover, in case that the base is a glazed ceramic product, the ceramic product can maintain its surface constantly clean. Also in case that the base is an enameled product, the enameled product can maintain a constantly clean surface.

DETAILED DESCRIPTION

Figure 1:
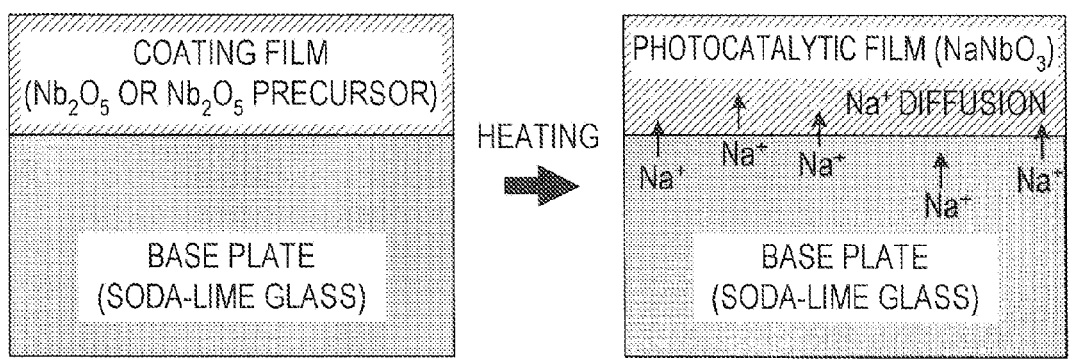
FIG. 1 is a view that explains how reaction involving soda-lime glass and niobium occurs and a photocatalytic film containing niobium-sodium compound oxide is formed on a surface of the soda-lime glass.

The present invention is described based on an embodiment.

Embodiment

(a) Producing Coating Liquid

A solution was prepared wherein catechol was dissolved in a suitable amount of toluene. To the solution, niobium(V) ethoxide was added such that the mol ratio of niobium(V) ethoxide to catechol became 2:5. The total amount of the solvent in the compound liquid was adjusted such that the concentration of niobium(V)ethoxide became 0.5M.

A half of the solution was distilled. During the distillation, it was confirmed that the temperature of vapor became 100° C. A volatile component of the mixed solution remained after the distillation was evaporated under reduced pressure of a rotary evaporator. Remaining solid content was further heated to 100° C. under vacuum using a vacuum dryer thereby to completely remove the residual volatile component. Drying was continued until the amount of a solid (niobium catecholate) close to a theoretical value (about 98%) was obtained.

In the present embodiment, the solid (niobium catecholate) of 56.0 g, 98% was obtained from the solution of niobium(V) ethoxide (50.0 g, 0.157 mol), catechol (43.4 g, 0.393 mol) and toluene (320 mL).

The obtained niobium catecholate was dissolved into a compound liquid wherein acetylacetone and toluene were blended in the volume ratio of 1:4. Then, a coating liquid was prepared by adjusting the concentration of niobium in the compound liquid to be 0.10 M, or 4 wt. %.

(b) Forming Films 0.4 mL of the obtained coating liquid was applied to a surface of each base made of soda-lime glass (SLG) or of Pyrex (registered trademark) glass (PYR) in the size of 50×50×3 tmm by spin coat method (rotation frequency during coating: 750 rpm).

The coated glass base coated with the coating liquid was fired in an electric furnace thereby to obtain niobium oxide-coated glass. The firing temperature was set to 400, 450, 500, 550 or 600° C. The firing was performed for 1 hour (increased by 10° C./min, naturally cooled) in the atmosphere.

After the firing, a favorable film was obtained on each of the coated glass bases.

(c) Evaluation of Film Forming State (Niobium Oxide)

With regard to each of the niobium oxide coated glasses produced in the above, total transmission, turbidity, and color difference were measured. Total transmission and turbidity were measured based on JIS K 7136 by using NDH-500 W produced by Nippon Denshoku Industries Co., Ltd. Color difference was measured based on JIS Z 8722 by using SE-2000 produced by Nippon Denshoku Industries Co., Ltd. Results of the measurements were shown in Table 1 below.

TABLE 1

| Metal Oxide | Substrate | Firing Temperature (° C.) | Total Transmission Rate (%) | Turbidity (%) | Color Difference (ΔE) |
|---|---|---|---|---|---|
| $Nb_2O_5$ | SLG | 400 | 82.03 | 0.20 | 7.02 |
| $Nb_2O_5$ | SLG | 450 | 86.76 | 0.17 | 2.54 |
| $Nb_2O_5$ | SLG | 500 | 86.48 | 0.40 | 2.52 |
| $Nb_2O_5$ | SLG | 550 | 86.47 | 0.20 | 2.49 |
| $Nb_2O_5$ | SLG | 600 | 85.08 | 0.17 | 3.44 |
| $Nb_2O_5$ | PYR | 500 | 87.95 | 0.14 | 1.79 |
| $TiO_2$ | SLG | 500 | 86.42 | 0.16 | 1.98 |
| $TiO_2$ | PYR | 500 | 88.36 | 0.16 | 1.96 |

To each of the niobium oxide-coated glasses obtained in the above (b) of the embodiment, artificial sunshine was irradiated for 1 hour at 5 mm below water surface of 0.01 M silver nitrate solution. Then, photocatalytic activity of each sample was compared and evaluated based on presence/absence of metallic silver deposition resulted from photocatalytic reaction. Results of the evaluation were shown in Table 2 below. Silver deposition (presence/absence of reaction) was visually confirmed.

(d) Photo-Induced Reduction Reaction Test of Silver Nitrate (Niobium Oxide)

TABLE 2

| Metal Oxide | Substrate | Firing Temperature (° C.) | Silver Deposition* |
|---|---|---|---|
| $Nb_2O_5$ | SLG | 400 | X |
| $Nb_2O_5$ | SLG | 450 | X |
| $Nb_2O_5$ | SLG | 500 | ○ |
| $Nb_2O_5$ | SLG | 550 | ○ |

TABLE 2-continued

| Metal Oxide | Substrate | Firing Temperature (° C.) | Silver Deposition* |
|---|---|---|---|
| Nb₂O₅ | SLG | 600 | Δ |
| Nb₂O₅ | PYR | 500 | X |
| TiO₂ | SLG | 500 | X |
| TiO₂ | PYR | 500 | ○ |

*○: Silver deposition is clearly recognized. Δ: Silver deposition is slightly recognized. X: Silver deposition is not recognized.

(e) Evaluation of Photo-Induced Super-Hydrophilic Property (Niobium Oxide)

Changes in contact angle of water by UV irradiation to each of the niobium oxide-coated glasses obtained in the above (b) of the embodiment were shown in Table 3 below. UV was irradiated at an intensity of 2.4 mW/cm² (intensity when the wavelength of light is 365 nm) by using a 40 W-BLB lamp.

TABLE 3

| Metal Oxide | Substrate | Firing Temperature (° C.) | Contact Angle (°) | | | | | | Hydrophilic Property* |
|---|---|---|---|---|---|---|---|---|---|
| | | | Prior to Irradiation | 1 h | 2 h | 3 h | 6 h | 24 h | |
| Nb₂O₅ | SLG | 400 | 36.9 | 30.1 | 26.4 | 26.5 | 23.9 | 20.9 | Δ |
| Nb₂O₅ | SLG | 450 | 31.4 | 18.7 | 15.9 | 12.9 | 11.7 | 15.1 | Δ |
| Nb₂O₅ | SLG | 500 | 32.7 | 3.7 | 3.3 | 4.2 | 2.3 | 4.2 | ○ |
| Nb₂O₅ | SLG | 550 | 27.3 | 2.1 | 2.5 | 4.4 | 3.0 | 4.7 | ○ |
| Nb₂O₅ | SLG | 600 | 29.0 | 7.0 | 5.8 | 6.5 | 5.7 | 5.8 | Δ |
| Nb₂O₅ | PYR | 500 | 44.9 | 3.9 | 3.9 | 4.0 | 2.1 | 1.2 | ○ |
| TiO₂ | SLG | 500 | 40.3 | 17.1 | 9.3 | 7.7 | 5.2 | 14.2 | Δ |
| TiO₂ | PYR | 500 | 50.2 | 3.9 | 4.1 | 3.5 | 1.3 | 1.9 | ○ |

*○: Become super hydrophilic such that the contact angle becomes 5° or smaller Δ: Become hydrophilic X: Does not become hydrophilic (f) Evaluation of Crystalline State (Niobium Oxide)

The crystalline state of each of the niobium oxide films formed on the soda-lime glass in the above (b) of the embodiment was analyzed by X-ray diffraction. Measurements were performed by using a thin film X-ray diffraction device (D8 DISCOVER) produced by Bruker AXS K. K. Results of the measurement were shown in FIG. 2.

Comparative Example (f) Producing Coating Liquid (Complex of Titanium(IV)Isopropoxide (TTIP) and Catechol)

A solution was prepared wherein catechol was dissolved in a suitable amount of toluene. To the solution, titanium(IV) isopropoxide was added such that the mol ratio of TTIP and catechol became 1:2. The total amount of the solvent in the compound liquid was adjusted such that the concentration of TTIP became 0.5M.

A half of the solution was distilled. During the distillation, it was confirmed that the temperature of vapor became 100° C. A volatile component of the mixed solution remained after the distillation was evaporated under reduced pressure of a rotary evaporator. Remaining solid content was further heated to 100° C. under vacuum using a vacuum dryer thereby to completely remove the residual volatile component. Drying was continued until the amount of the solid became a value close to a theoretical value. Drying was continued until an amount of a solid (titanium catecholate) close to a theoretical value (about 98%) was obtained.

In the present comparative example, the solid (titanium catecholate) of 38.8 g, 98% was obtained from the solution of TTIP (42.6 g, 0.150 mol), catechol (33.0 g, 0.300 mol) and toluene (300 mL).

The obtained titanium catecholate was dissolved into a compound liquid wherein acetylacetone and toluene were blended in the volume ratio of 1:4. Then, a coating liquid was prepared by adjusting the concentration of titanium in the compound liquid to be 0.10 M, or 3 wt. %.

(g) Forming Films 0.4 mL of the obtained coating liquid was applied to a surface of each base made of soda-lime glass (SLG) or of Pyrex (registered trademark) glass (PYR) in the size of 50×50×3 tmm by spin coat method (rotation frequency during coating: 750 rpm).

The coated glass base coated with the coating liquid was fired in an electric furnace thereby to obtain titanium oxide-coated glass. The firing temperature was 500° C. The firing was performed for 1 hour (increased by 10° C./min, naturally cooled) in the atmosphere.

After the firing, a favorable film was obtained on each of the coated glass bases.

(h) Evaluation of Film Forming State (Titanium Oxide)

With regard to each of the titanium oxide coated glasses produced in the above, total transmission, turbidity, and color difference were measured. The measurements were conducted in the same manner as in (c) of the embodiment. The results were shown in the above Table 1.

(i) Photo-Induced Reduction Reaction Test of Silver Nitrate (Titanium Oxide)

To the titanium oxide-coated glass obtained in the above (g) of the comparative example, artificial sunshine is irradiated for 1 hour at 5 mm below water surface of 0.01 M silver nitrate solution. Then, photocatalytic activity of each sample was compared and evaluated based on presence/absence of metallic silver deposition resulted from photocatalytic reaction. Results of the evaluation were shown in the above Table 2. Silver deposition (presence/absence of reaction) was visually confirmed.

(j) Evaluation of Photo-Induced Super-Hydrophilic Property (Titanium Oxide)

Changes in contact angle of water by UV irradiation to each of the titanium oxide-coated glasses obtained in the above (g) of the comparative example were shown in the above Table 3. UV was irradiated at an intensity of 2.4 mW/cm$^2$ (intensity when the wavelength of light is 365 nm) by using a 40 W-BLB lamp.

[Results of Comparison]

(Comparison Result 1)

Table 2 shows photocatalytic activity of the niobium oxide film formed on soda-lime glass (soda-lime glass) containing a considerable amount of sodium ion. Table 2 also shows photocatalytic activity of a niobium oxide film formed on Pyrex (registered trademark) glass containing a small amount of sodium ion, a titanium oxide film formed on soda-lime glass, and a titanium oxide film formed on Pyrex (registered trademark) glass for comparison. From Table 2, the following three points are obvious.

(1) In the case of niobium oxide film on soda-lime glass, photocatalytic activity is exhibited at 500° C. or higher. Photocatalytic activity is significantly exhibited especially at the firing temperature of 500-550° C.

(2) In the case of niobium oxide film on Pyrex (registered trademark) glass, exhibition of photocatalytic activity is inferior.

(3) In the case of titanium oxide film, photocatalytic activity is favorably exhibited on Pyrex (registered trademark) glass. However, photocatalytic activity is not exhibited on soda-lime glass.

In other words, in the case of titanium oxide film, photocatalytic activity is lost when much sodium ion exists, while, the niobium oxide film makes a better photocatalyst by taking in sodium ion.

During firing at low temperature (450° C. or lower), an amount of diffraction of sodium is small. Although a film can be formed, photocatalytic activity is not exhibited. It is considered that sodium ion sufficient to exhibit photocatalytic activity was dispersed during firing at 500° C. or higher.

Figure 2:
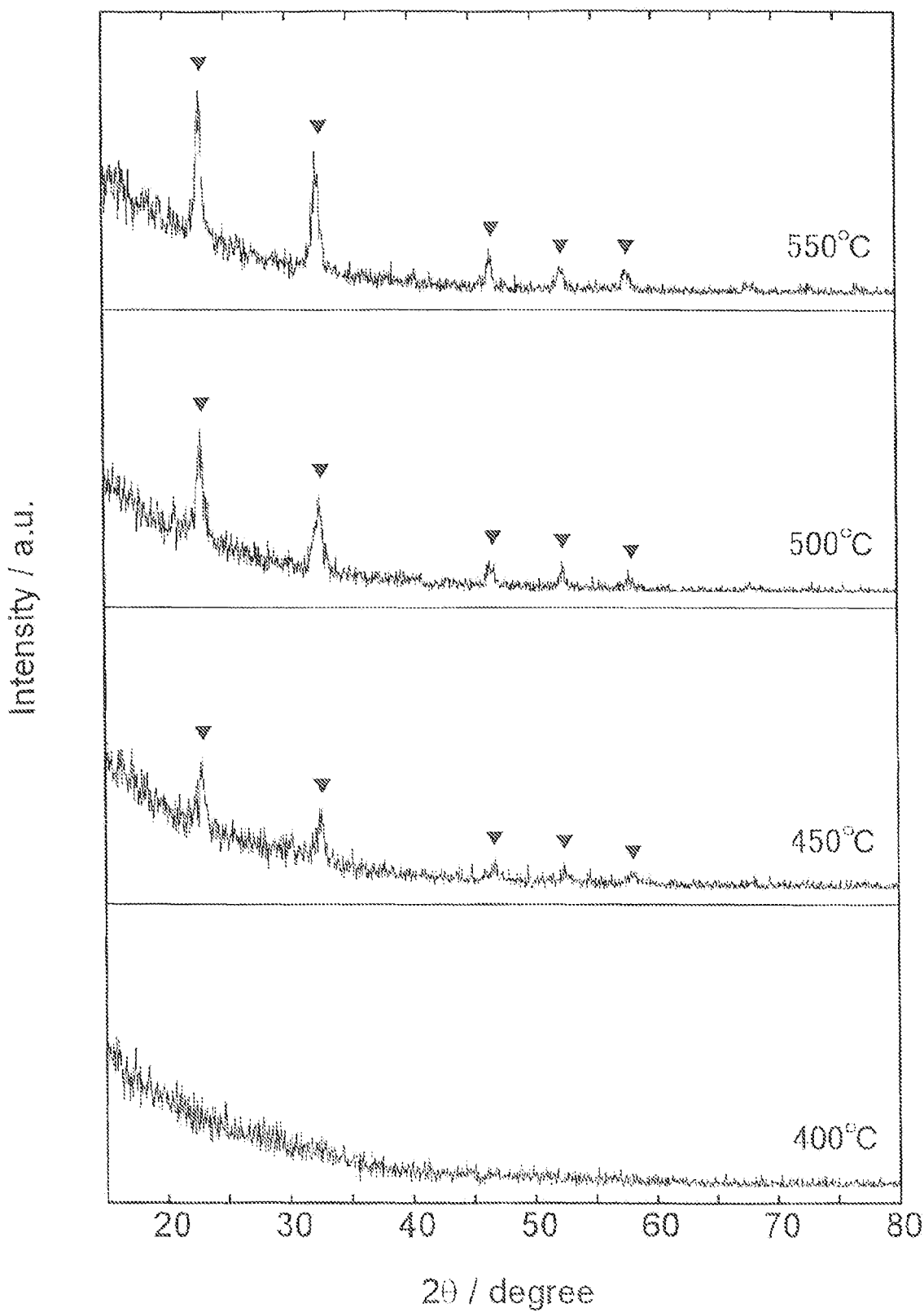
FIG. 2 is a chart showing results of analysis of a crystalline state of a niobium oxide film formed on the soda-lime glass by X-ray diffraction.

FIG. 2 shows an image of X-ray diffraction of niobium oxide film formed on soda-lime glass. During firing at 400° C. for 1 hour, a diffraction peak is not recognized. It is understood that the film is in a noncrystalline state. On the other hand, during firing at 450° C. or higher, a diffraction peak attributed to sodium niobate (NaNbO$_3$) shown by a sign ▼ is generated. It is understood that a complex oxide of niobium and sodium is formed. Since the high peak is observed in the films fired especially at 500° C. and 550° C., it is considered that crystallization has advanced and high photocatalytic activity is exhibited.

(Comparison Result 2)

Table 3 compares photo-induced super-hydrophilic properties in case that the niobium oxide film and the titanium oxide film were formed on soda-lime glass and Pyrex (registered trademark) glass. From Table 3, the following two points are obvious.

(1) In the case of niobium oxide film, the hydrophilic property is exhibited at 400° C. and higher. The super-hydrophilic property is significantly exhibited especially at the firing temperature of 500-550° C.

(2) In the case of titanium oxide film, the super-hydrophilic property is exhibited on Pyrex (registered trademark) glass but not on soda-lime glass.

In the titanium oxide film, inhibition of activity by sodium ion can be observed with respect to the super-hydrophilic property as in photocatalytic activity shown in the comparison result 1, while, in the niobium oxide film, the super-hydrophilic property is not lost even if sodium ion exists. The reason why hydrophilic activity is slightly low during firing at 600° C. may be because the film has changed to other crystal system. However, there is no conclusive evidence at present.

From the aforementioned results, the niobium oxide film is effective as a photo-induced self-cleaning coating for a base where sodium ion is dispersed.

It is to be noted that the present invention is not limited to the above-described embodiment, and that the present invention can be carried out in various ways without departing from the scope of the invention.

For instance, in order to optimize photocatalytic activity, the alkali metal component such as sodium may be added to the composition of the coating liquid.

What is claimed is:

1. A method for forming a photocatalytic film, wherein a photocatalytic film containing niobium-alkali metal complex oxide is formed by forming and then firing at a temperature of 500° C. or higher, a liquid layer containing niobium dispersed directly on a surface of a base, the base containing alkali metal and without an undercoating film disposed between the layer containing the niobium and the surface of the base containing alkali metal, and wherein the formed photocatalytic film is super-hydrophilic and photocatalytic.

2. The method for forming a photocatalytic film according to claim 1, wherein the layer containing niobium is formed by applying a coating agent containing niobium.

3. A method for forming a photocatalytic film, wherein a photocatalytic film containing tantalum-alkali metal complex oxide is formed by directly dispersing a liquid layer containing tantalum on a surface of a base containing alkali metal and then firing the layer containing tantalum at a temperature of 500° C. or higher.

4. The method for forming a photocatalytic film according to claim 3, wherein the layer containing tantalum is formed by applying a coating agent containing tantalum.

5. The method for forming a photocatalytic film according to claim 1, wherein the base containing alkali metal is soda-lime glass.

6. The method for forming a photocatalytic film according to claim 1, wherein the base containing alkali metal is a glassy film formed on a surface of a ceramic ware by glazing.

7. The method for forming a photocatalytic film according to claim 1, wherein the base containing alkali metal is a glassy film formed on a surface of a metal product by enameling.

8. The method for forming a photocatalytic film according to claim 1, wherein a firing temperature is 500-550° C.

9. A photocatalytic film formed by the method for forming a photocatalytic film according to claim 1, wherein the alkali metal is sodium.

10. A photocatalytic film-coated product including:
a base containing alkali metal; and
the photocatalytic film set forth in claim 9 that is provided on a surface of the base.

11. The method for forming a photocatalytic film according to claim 3, wherein the base containing alkali metal is soda-lime glass.

12. The method for forming a photocatalytic film according to claim 3, wherein the base containing alkali metal is a glassy film formed on a surface of a ceramic ware by glazing.

13. The method for forming a photocatalytic film according to claim 3, wherein the base containing alkali metal is a glassy film formed on a surface of a metal product by enameling.

14. The method for forming a photocatalytic film according to claim 3, wherein a firing temperature is 500-550° C.

15. A photocatalytic film formed by the method for forming a photocatalytic film according to claim 3, wherein the alkali metal is sodium.

* * * * *